United States Patent
Hsiao et al.

(10) Patent No.: US 9,898,797 B2
(45) Date of Patent: Feb. 20, 2018

(54) THERMAL MANAGEMENT FOR SMOOTH VARIATION IN DISPLAY FRAME RATE

(71) Applicant: MediaTek Inc., Hsinchu (TW)

(72) Inventors: Chih-Yuan Hsiao, New Taipei (TW); Wei-Ting Wang, Taipei (TW); Jih-Cheng Chiu, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/213,539

(22) Filed: Jul. 19, 2016

(65) Prior Publication Data

US 2016/0328821 A1 Nov. 10, 2016

Related U.S. Application Data

(60) Provisional application No. 62/198,319, filed on Jul. 29, 2015.

(51) Int. Cl.
| | |
|---|---|
| G06F 3/14 | (2006.01) |
| G06T 1/20 | (2006.01) |
| H04N 7/01 | (2006.01) |
| G09G 5/36 | (2006.01) |
| G09G 5/00 | (2006.01) |

(52) U.S. Cl.
CPC .......... *G06T 1/20* (2013.01); *G06F 3/14* (2013.01); *G09G 5/00* (2013.01); *G09G 5/363* (2013.01); *H04N 7/0127* (2013.01); *G09G 2320/041* (2013.01); *G09G 2340/0435* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 6,297,850 B1* | 10/2001 | Han | H04N 5/08 348/521 |
| 2002/0030673 A1* | 3/2002 | Ikemoto | G09G 3/20 345/204 |
| 2007/0057952 A1* | 3/2007 | Swedberg | G09G 5/00 345/474 |
| 2008/0055318 A1* | 3/2008 | Glen | G09G 3/20 345/501 |
| 2008/0192060 A1* | 8/2008 | Ogiso | G06F 3/14 345/546 |
| 2012/0086767 A1* | 4/2012 | Lau | H04N 7/148 348/14.02 |
| 2015/0229816 A1* | 8/2015 | Tomiyasu | H04N 5/232 348/207.99 |

\* cited by examiner

*Primary Examiner* — Joni Richer
(74) *Attorney, Agent, or Firm* — Han IP Corporation; Andy M. Han

(57) ABSTRACT

Techniques pertaining to thermal management for smooth variation in display frame rate are described. A method may involve performing either or both of: (1) determining whether a temperature of at least one portion of an electronic apparatus exceeds a temperature threshold; and (2) determining whether a variation in a frame rate of images displayed on a display device associated with the electronic apparatus exceeds a variation threshold. The method may also involve controlling the frame rate in response to either or both of a first determination that the monitored temperature exceeds the temperature threshold and a second determination that the variation in the frame rate exceeds the variation threshold.

20 Claims, 5 Drawing Sheets

THERMAL MANAGEMENT FOR SMOOTH VARIATION IN DISPLAY FRAME RATE

CROSS REFERENCE TO RELATED PATENT APPLICATIONS

The present disclosure claims the priority benefit of U.S. Patent Application Ser. No. 62/198,319, filed on 29 Jul. 2015, which is incorporated by reference in its entirety.

TECHNICAL FIELD

The present disclosure is generally related to thermal management in electronic apparatuses and, more particularly, to thermal management in electronic apparatuses for a smooth variation in a display frame rate.

BACKGROUND

Unless otherwise indicated herein, approaches described in this section are not prior art to the claims listed below and are not admitted to be prior art by inclusion in this section.

Modern electronic apparatuses with display capability tend to consume relatively large amount of power due to factors such as high display resolution, large display panel size, multi-core processing and high operation frequency. Meanwhile there is a continuously pursuit for low thermal cost and small form factors (e.g., slimness and thinness) for portable electronic apparatuses such as smartphones. Software-based thermal management is an approach to rearrange the usage of system resources of an electronic apparatus to achieve a balance between skin temperature of the electronic apparatus (e.g., smartphone) and performance thereof while protecting components of the electronic apparatus from damage due to high temperature. Nevertheless, existing designs of software-based thermal management typically seek maximizing system performance within thermal limits at the expense of user experience (e.g., a side effect of "frame lag" in a content being displayed may result). For example, one conventional approach maintains the temperature of chip die and skin within respective thermal limits by throttling the frequency of a central processing unit (CPU) and/or a graphics processing unit (GPU) of the electronic apparatus. The conventional approach aims to control the system power so as not to cause the temperatures of components and skin of the electronic apparatus to exceed their respective limits. However, the conventional approach tends not to take into account display frame rate, or the smoothness thereof, in controlling the system power under an over-temperature condition even though the smoothness of display frame rate is an important factor to user experience.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

The present disclosure provides techniques, schemes, methods and apparatus pertaining to thermal management for smooth variation in display frame rate. In one example implementation, a method may involve performing either or both of: (1) determining whether a temperature of at least one portion of an electronic apparatus exceeds a temperature threshold; and (2) determining whether a variation in a frame rate of images displayed on a display device associated with the electronic apparatus exceeds a variation threshold. The method may also involve controlling the frame rate in response to either or both of a first determination that the monitored temperature exceeds the temperature threshold and a second determination that the variation in the frame rate exceeds the variation threshold.

In another example implementation, an apparatus may include a memory device configured to store data, one or more sets of processor-executable instructions, or a combination thereof. The apparatus may also include a processor coupled to access the memory device. The processor may include a reception unit, a determination unit and a control unit. The reception unit may be configured to receive information from one or more components and/or sensors of the apparatus. The determination unit may be configured to determine whether a temperature of at least one portion of the apparatus exceeds a temperature threshold based on the received information. The determination unit may be further configured to determine whether a variation in a frame rate of images displayed on a display device associated with the apparatus exceeds a variation threshold. The control unit may be configured to control the frame rate in response to either or both of a first determination that the monitored temperature exceeds the temperature threshold and a second determination that the variation in the frame rate exceeds the variation threshold.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION

Overview

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

In various types of an electronic apparatus with display capability, a periodic timing control signal originated from a display controller of the electronic apparatus, such as a vertical synchronization signal ($V_{Sync}$), is utilized as a trigger for a multitude of events in a display subsystem of the electronic apparatus, including application rendering, touch-sensing events, screen composition and display refresh, for temporal synchronization so as to output image frames for display at a consistent frame rate. Accordingly, implementations in accordance with the present disclosure may control the frame rate by dynamically adjusting or otherwise modifying a frequency of $V_{Sync}$ to control the usage of hardware resources of CPU, GPU and/or overlay in the display controller of the electronic apparatus. That is, implementations in accordance with the present disclosure may smoothly limit software behavior (e.g., in terms of frames per second, or FPS) to improve power saving and reduce thermal output from hardware resources/components, including CPU, GPU and/or overlay in the display controller. In the present disclosure, the term "software behavior" may refer to application rendering of surface(s) as well as compositing of application and system surfaces into a single buffer to be displayed by the display controller.

Thus, in various implementations in accordance with the present disclosure, a frequency at which the display frame rate is updated based on $V_{Sync}$ may be limited so as to achieve consistent user interface (e.g., no stuttering in images being displayed) under an over-temperature condition. Moreover, software-based thermal management in accordance with the present disclosure may dynamically control the display frame rate (expressed in FPS) based on one or more temperatures (e.g., skin temperature and/or die temperature) and previous FPS performance such as "frame drop" that happened previously or is going to happen. Advantageously, smooth display frame rate and improved user experience may be achieved by implementations in accordance with the present disclosure. Other benefits provided by implementations in accordance with the present disclosure include, for example and not limited to, power saving (e.g., due to lower CPU and/or GPU loading) and less overall thermal output by the electronic apparatus.

Figure 1:
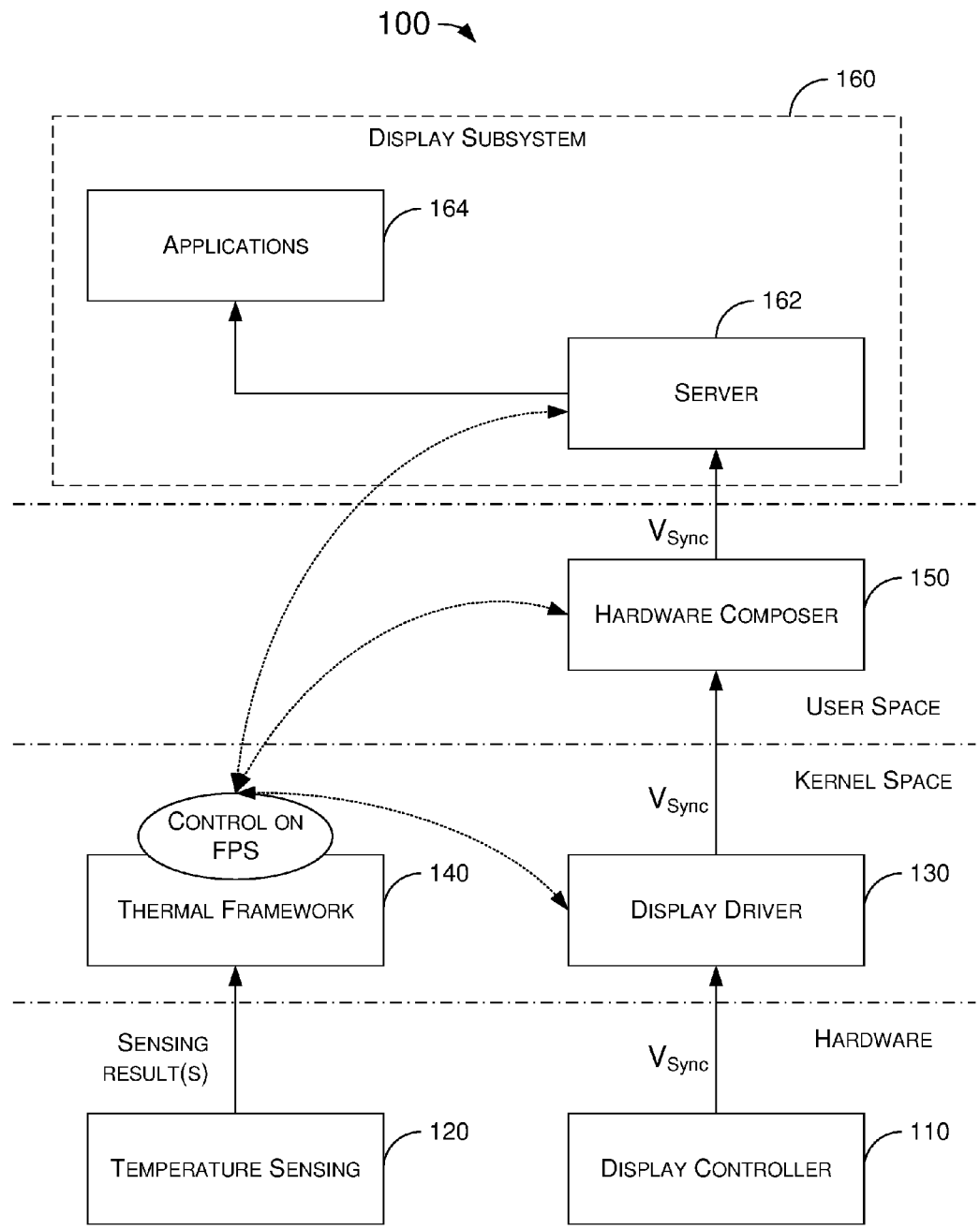
FIG. 1 is a diagram of an example scheme, involving functions associated with one or more electronic apparatuses for displaying images, in which various techniques in accordance with the present disclosure may be implemented.

FIG. 1 illustrates an example scheme 100, involving functions associated with one or more electronic apparatuses for displaying images, in which various techniques in accordance with the present disclosure may be implemented. Referring to FIG. 1, scheme 100 may involve at least the following function blocks: display controller 110, temperature sensing 120, display driver 130, thermal framework 140, hardware composer 150 and display subsystem 160, which may include at least the function blocks of server 162 and applications 164.

Each of the functions of scheme 100 may be associated with and implemented by one or more hardware components, one or more firmware components and/or one or more software components. Each hardware component may be in the form of one or more electronic circuits each respectively including physical elements such as one or more transistors, one or more diodes, one or more capacitors, one or more resistors, one or more inductors, one or more varactors and/or one or more memristors. For example, the function of display controller 110 may be associated with and implemented by an electronic circuit (and any necessary firmware and/or software components) designed to perform operations as a display controller. As another example, the function of temperature sensing 120 may be associated with and implemented by one or more physical temperature sensors such as, for example and not limited to, one or more thermometers, one or more thermistors, one or more thermocouples, one or more resistance thermometers and one or more silicon bandgap temperature sensors. As a further example, the function of thermal framework 140 may be associated with and implemented by an electronic circuit (and any necessary firmware and/or software components) designed to perform operations as a controller or a processor to effect thermal management for a smooth variation in a display frame rate.

The functions of scheme 100 may be implemented in and by a single electronic apparatus. For example and without limiting the scope of the present disclosure, the functions of scheme 100 may be implemented in and by a smartphone to effect thermal management for the smartphone while providing a smooth variation in a display frame rate for images displayed by a display device (e.g., display panel) of the smartphone. The functions of scheme 100 may also be implemented in and by multiple electronic apparatuses. For example and without limiting the scope of the present disclosure, the functions of scheme 100 may be implemented in and by a smartphone and a smart television to effect thermal management in the smartphone while providing a smooth variation in a display frame rate for images displayed by the smart television.

Referring to FIG. 1, the function of display controller 110 may involve generating a periodic timing control signal, labeled as $V_{Sync}$ in FIG. 1, which may be utilized for synchronizing the display frame rate (FPS) with a refresh rate of the function of a display device. This periodic timing control signal may be provided to display driver 130, which may provide the periodic timing control signal to hardware composer 150, which may provide the periodic timing control signal to server 162 within display subsystem 160. The function of temperature sensing 120 may involve sensing the temperature of one or more components of an electronic apparatus such as, for example and not limited to, one or more chip dies, one or more spots on a casing of the electronic apparatus and one or more spots on a printed circuit board (PCB). The result(s) of the function of temperature sensing 120 may be provided to thermal framework 140. This enables thermal framework 140 to periodically monitor the thermal condition, or temperature, with respect to one or more components of the electronic apparatus.

Each of the one or more monitored temperatures may have a respective temperature threshold. For example, a temperature threshold for the chip die of a CPU or processor of the electronic apparatus may be $T_1$, a temperature threshold for the chip die of a GPU of the electronic apparatus may be $T_2$, and a temperature threshold for a monitored spot on a casing of the electronic apparatus may be $T_3$. Each temperature threshold may be the same as another temperature threshold or may be different from other temperature threshold(s).

Upon detecting and determining that one of the one or more monitored temperatures has exceeded its respective temperature threshold, the function of thermal framework 140 may perform a number of operations to effect thermal management in accordance with the present disclosure. Specifically, thermal framework 140 may control or otherwise limit, in one or more ways, the frame rate of images displayed by the display device, and such function of thermal framework 140 is labeled as "control on FPS" in FIG. 1. In some implementations, thermal framework 140 may receive, retrieve or otherwise obtain data on a frequency of the periodic timing control signal (e.g., $V_{Sync}$ data) as well as content FPS data from at least one of display driver 130, hardware composer 150 and server 162, and thermal framework 140 may also send or otherwise provide modified $V_{Sync}$ data to at least one of display driver 130, hardware composer 150 and server 162 to effect the control on the frame rate. For instance, thermal framework 140 may limit a frequency at which the frame rate is varied. Alternatively or additionally, thermal framework 140 may modify a frequency of the periodic timing control signal (e.g., $V_{Sync}$), originated from display controller 110, somewhere between display controller 110 and applications 164. In controlling the frame rate, scheme 100 may involve setting the frame rate based on (1) the temperature of the one of the one or more monitored temperatures exceeding its respective temperature threshold and (2) a previous frame rate before the frame rate is under control in accordance with the present disclosure.

During the period of time when the frame rate is under control in accordance with the present disclosure, the periodic timing control signal is modified to let application rendering, touch events, screen composition, and display refresh to be synchronized and output a consistent frame rate. Accordingly, the usage of hardware resources such as CPU, GPU, overlay are properly controlled to meet thermal requirement and maintain smooth display quality at the same time.

This is so that the same user experience (e.g., with respect to the content and/or images being displayed), relative to that during the period of time when the frame rate is not under control, may be maintained.

One way for the function of thermal framework 140 to modify the frequency of the periodic timing control signal originated from the function of display controller 110 is to cause one of the functions of display driver 130, hardware composer 150 and server 162 to selectively drop or bypass the periodic timing control signal. For example, for every two instances of the periodic timing control signal, one of the functions of display driver 130, hardware composer 150 and server 162 may selectively drop or bypass the first instance or the second instance so as to modify the frequency of the periodic timing control signal as seen by components/functions downstream therefrom by effectively decreasing the modified frequency of the periodic timing control signal by 50%.

Another way for the function of thermal framework 140 to modify the frequency of the periodic timing control signal originated from the function of display controller 110 is to cause one of the functions of display driver 130, hardware composer 150 and server 162 to generate a replacement signal periodically at a frequency that is different from the frequency of the periodic timing control signal and then replace the periodic timing control signal with the replacement signal. For example, one of the functions of display driver 130, hardware composer 150 and server 162 may replace the periodic timing control signal with a replacement signal having a frequency that is ⅔ of the frequency of the periodic timing control signal by providing the replacement signal downstream. As a result, the frequency as seen by components and functions downstream therefrom may be effectively decreased by ⅓ from the frequency of the periodic timing control signal.

In modifying the frequency of the periodic timing control signal, scheme 100 may involve lowering the frame rate of images displayed by the display device to one of multiple predefined frame rates. For example, scheme 100 may have a number of predefined frame rates $FR_1$, $FR_2$, $FR_3$, $FR_4$ and $FR_5$, listed in a descending order in that $FR_1 > FR_2 > FR_3 > FR_4 > FR_5$. In this example, assuming the current frame rate, $FR_C$, is at $FR_2$. Then, in modifying the frequency of the periodic timing control signal, scheme 100 may involve lowering and limiting the frame rate to, and not to exceed, one of $FR_3$, $FR_4$ and $FR_5$. This may be effected, for example and not limited to, by the function of display subsystem 160.

During the period of time when the frame rate is under control in accordance with the present disclosure, scheme 100 may involve the function of thermal framework 140 continuing to monitor the temperature(s) and determining whether each of the monitored one or more temperatures has lowered (as a result of the control of the frame rate) and does not exceed its respective temperature threshold. Once the function of thermal framework 140 determines that each of the monitored one or more temperatures has lowered and does not exceed its respective temperature threshold, scheme 100 may cease the control of the frame rate. For example, the function of thermal framework 140 may cause one of the functions of display driver 130, hardware composer 150 and server 162 to cease the operation that was put in effect to control or otherwise limit the frame rate as described above.

In addition to or in lieu of controlling the frame rate based on monitored thermal condition, scheme 100 may control the frame rate when a variation in the frame rate exceeds a variation threshold. That is, when variation in the frame rate becomes excessive (which may cause the displayed images to appear jittery or show a "tearing" effect), scheme 100 may control the frame rate using any or all of the techniques described above in the context of thermal management. For example, when it is determined that the frame rate has dropped or is going to drop (e.g., has dropped or is going to drop a certain percentage or below a certain threshold), scheme 100 may control the frame rate in accordance with the present disclosure. The methods and techniques used in controlling the frame rate in the context of variation of the frame rate are the same as those used in the context of thermal management. Thus, in the interest of brevity, detailed description of the control of frame rate as a result of the variation of the frame rate exceeding the variation threshold is not provided so as to avoid redundancy.

Figure 2:
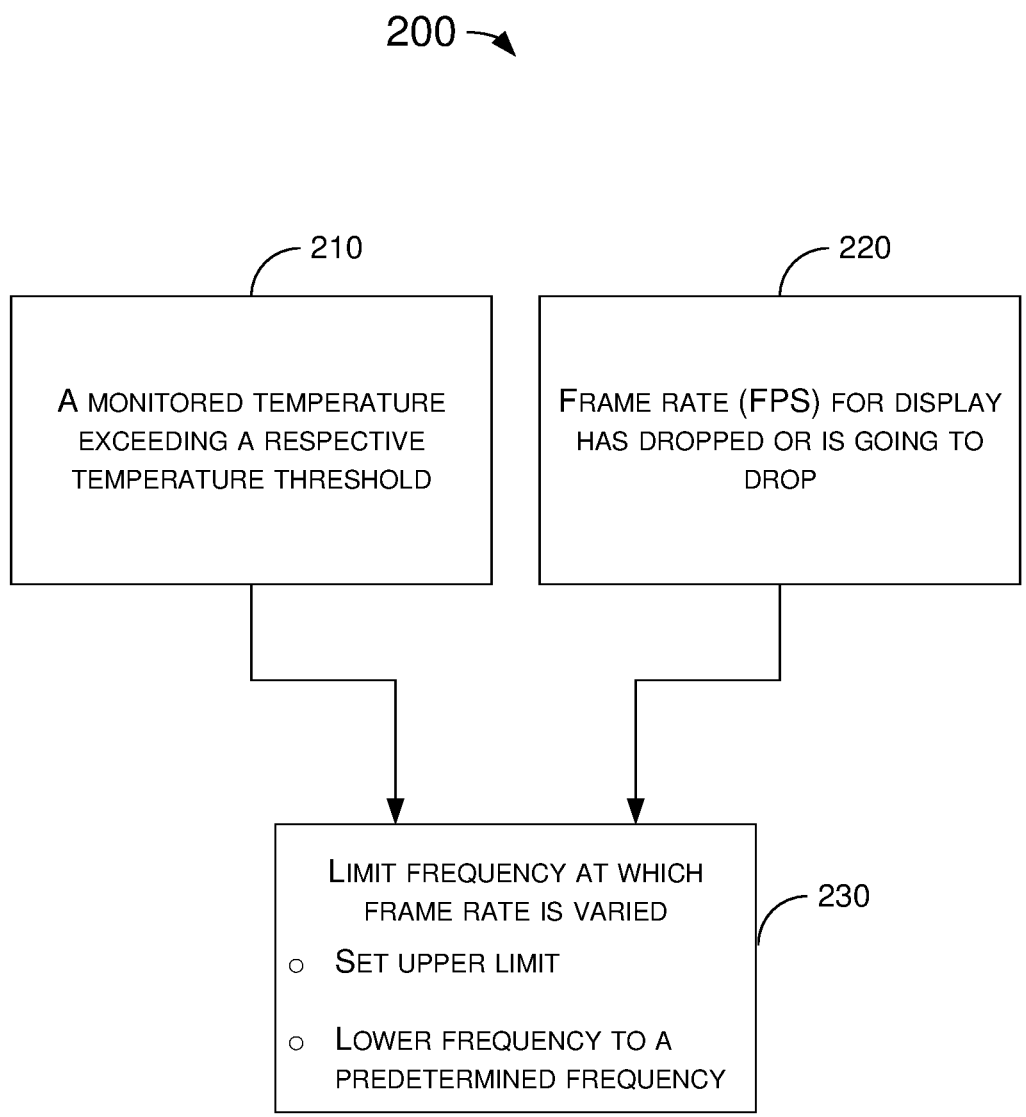
FIG. 2 is a diagram of an example algorithm in accordance with an implementation of the present disclosure.

FIG. 2 illustrates an example algorithm 200 in accordance with an implementation of the present disclosure. Algorithm 200 may include one or more operations, actions, or functions as represented by one or more of blocks 210, 220 and 230. Although illustrated as discrete blocks, various blocks of algorithm 200 may be divided into additional blocks, combined into fewer blocks, or eliminated, depending on the desired implementation. Algorithm 200 may be implemented by in scheme 100 and by an electronic apparatus such as example apparatus 400 described below. Algorithm 200 may begin at 210 and/or 220.

At 210, algorithm 200 may involve detection or determination that a monitored temperature exceeds a respective temperature threshold. Algorithm 200 may proceed from 210 to 230.

At 220, algorithm 200 may involve detection or determination that the frame rate of images being displayed by a display device having dropped or is going to drop (e.g., by a certain percentage or below a certain threshold). Algorithm 200 may proceed from 220 to 230.

At 230, algorithm 200 may involve controlling or otherwise limiting the frequency at which the frame rate is varied.

For instance, an upper limit may be set for the frequency at which the frame rate is varied. Alternatively or additionally, the frequency at which the frame rate is varied may be lowered to a predetermined frequency so as to avoid frequent change in the frame rate.

Figure 3:
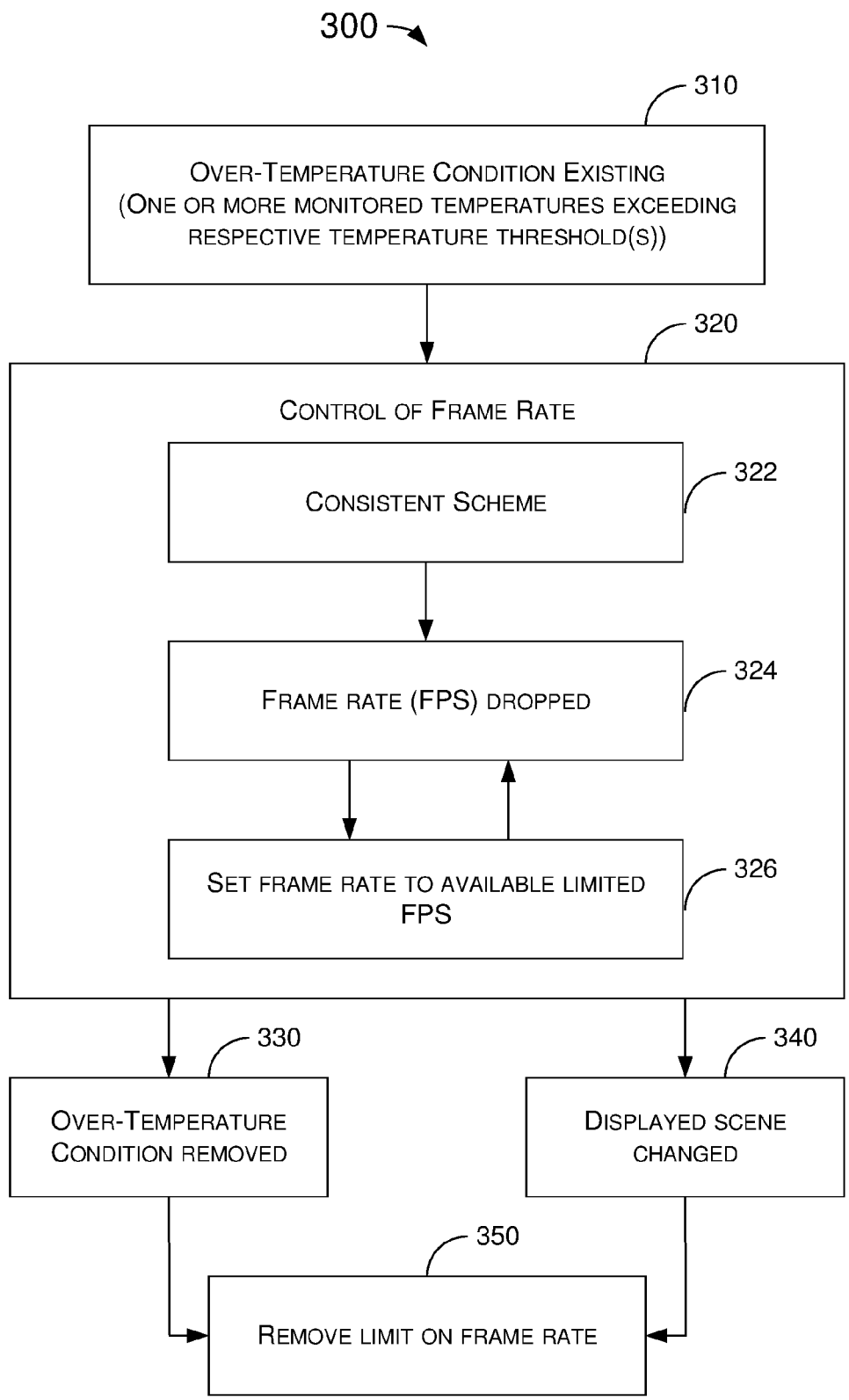
FIG. 3 is a diagram of an example algorithm in accordance with an implementation of the present disclosure.

FIG. 3 illustrates an example algorithm 300 in accordance with an implementation of the present disclosure. Algorithm 300 may include one or more operations, actions, or functions as represented by one or more of blocks 310, 320, 330, 340 and 350 as well as sub-blocks 322, 324 and 326. Although illustrated as discrete blocks, various blocks of algorithm 300 may be divided into additional blocks, combined into fewer blocks, or eliminated, depending on the desired implementation. Algorithm 300 may be implemented by in scheme 100 and by an electronic apparatus such as example apparatus 400 described below. Algorithm 300 may begin at 310.

At 310, algorithm 300 may involve detection or determination of the existence or occurrence of an over-temperature condition (e.g., at least one of the one or more monitored temperatures exceeding its respective temperature threshold). Algorithm 300 may proceed from 310 to 320.

At 320, algorithm 300 may involve controlling the frame rate by performing a number of operations, including those shown in sub-blocks 322, 324 and 326. Algorithm 300 may proceed from 320 to 330 and/or 340.

At 322, algorithm 300 may involve monitoring whether a consistent scheme is maintained with respect to the display. For example, variations in frame rate may be monitored to determine whether consistency is maintained (e.g., whether variation in the frame rate has been less than 20% for at least 5 seconds). Algorithm 300 may proceed from 322 to 324.

At 324, algorithm 300 may involve detecting or determining that the frame rate in FPS has dropped by at least a certain threshold (e.g., by at least 10%). Algorithm 300 may proceed from 324 to 326.

At 326, algorithm 300 may involve controlling the frame rate by setting the frame rate of images being displayed to one of multiple predefined and available frame rates. This may be achieved by utilizing one or more of the techniques described above with respect to scheme 100 and algorithm 200.

At 330, algorithm 300 may involve detection or determination of the removal of the over-temperature condition (e.g., none of the one or more monitored temperatures exceeds its respective temperature threshold). Algorithm 300 may proceed from 330 to 350.

At 340, algorithm 300 may involve detection or determination of a change in the displayed scene with respect to the images being displayed. For example, the displayed scene may change from a motion-filled scene to a motion-less or still scene. Algorithm 300 may proceed from 340 to 350.

At 350, algorithm 300 may involve removal of the control or limit on the frame rate or variation in the frame rate.

Example Implementations

Figure 4:
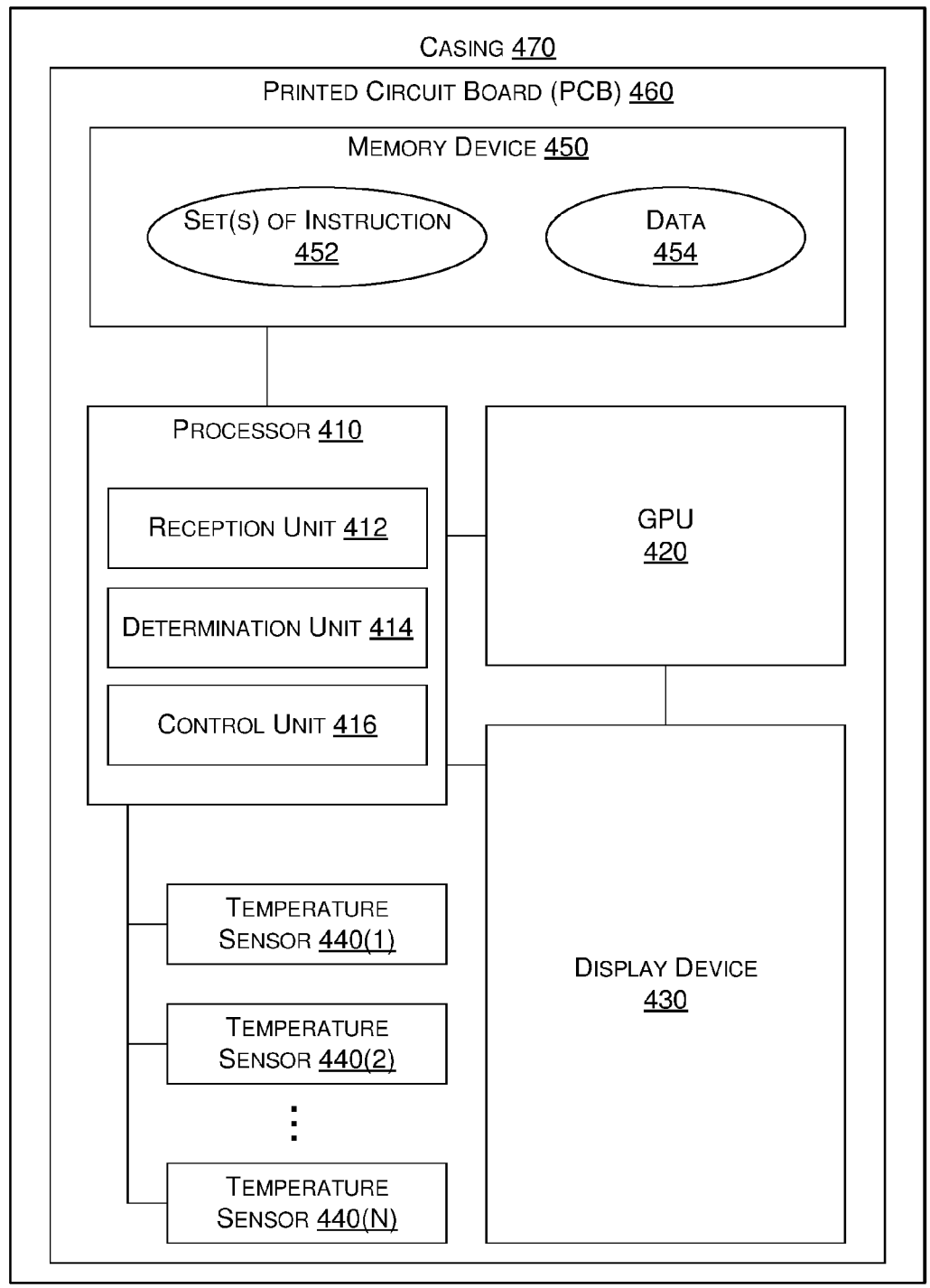
FIG. 4 is a simplified block diagram of an example apparatus in accordance with an implementations of the present disclosure.

FIG. 4 illustrates an example apparatus 400 in accordance with an implementations of the present disclosure. Apparatus 400 may perform various functions, tasks and/or operations related to concepts, techniques, schemes, solutions, scenarios, algorithms and methods described herein, including example scheme 100 and example algorithms 200 and 300 described above as well as example process 500 described below. Apparatus 400 may include one, some or all of the components shown in FIG. 4. Apparatus 400 may optionally include additional component(s) not shown in FIG. 4, as components not relevant to the present disclosure, albeit necessary for the operation of apparatus 400, are not shown in FIG. 4 so as to avoid obscuring the illustration. Apparatus 400 may be an electronic apparatus which may be, for example and not limited to, a portable device (e.g., smartphone, personal digital assistant, global positioning system (GPS) device or the like), a computing device (e.g., laptop computer, notebook computer, desktop computer, server or the like) or a wearable device (e.g., smartwatch, smart bracelet, smart necklace or the like). In some implementations, apparatus 400 may be implemented in the form of one or more integrated-circuit (IC) chips such as, for example and not limited to, one or more single-core processors, one or more multi-core processors, or one or more complex-instruction-set-computing (CISC) processors.

Apparatus 400 may include at least a processor 410. In some implementations, apparatus 400 may also include one or more of a GPU 420, a display device 430, one or more temperature sensors 440(1)-440(N) with N being a positive integer greater than or equal to 1, and a memory device 450. In some embodiments, apparatus 400 may also include a printed circuit board (PCB) 460 on which other component(s), such as processor 410, GPU 420, display device 430, one or more temperature sensors 440(1)-440(N) and/or memory device 450, may be installed or otherwise mounted. Apparatus 400 may include additional components (e.g., battery, power management circuitry and communication device) which may not be relevant to the present disclosure and thus are not shown in FIG. 4 so as to avoid obscuring the illustration.

Display device 430 may be configured to display textual, graphical and/or video images. Display device 430 may be a flat panel and/or a touch-sensing panel. Display device 430 may be implemented by any suitable technology such as, for example and not limited to, liquid crystal display (LCD), plasma display panel (PDP), light-emitting diode display (LED), organic light-emitting diode (OLED), electroluminescent display (ELD), surface-conduction electron-emitter display (SED), field emission display (FED), laser, carbon nanotubes, quantum dot display, interferometric modulator display (IMOD) and digital micro-shutter display (DMS). GPU 420 may be operatively coupled to display device 430 to provide digital data of contents to be displayed by display device 430.

Memory device 450 may be configured to store one or more sets of instruction 452 and data 454 therein. The one or more sets of instruction 452 may be executed by processor 410 to cause processor 410 to perform operations in accordance with the present disclosure, including thermal management by the control of frame rate. Memory device 450 may be implemented by any suitable technology and may include volatile memory and/or non-volatile memory. For example, memory device 450 may include a type of random access memory (RAM) such as dynamic RAM (DRAM), static RAM (SRAM), thyristor RAM (T-RAM) and/or zero-capacitor RAM (Z-RAM). Alternatively or additionally, memory device 450 may include a type of read-only memory (ROM) such as mask ROM, programmable ROM (PROM), erasable programmable ROM (EPROM) and/or electrically erasable programmable ROM (EEPROM). Alternatively or additionally, memory device 450 may include a type of non-volatile random-access memory (NVRAM) such as flash memory, solid-state memory, ferroelectric RAM (FeRAM), magnetoresistive RAM (MRAM) and/or phase-change memory.

Each of the one or more temperature sensors 440(1)-440(N) may be configured to sense a temperature at a location where the temperature sensor is disposed, and may generate and provide an electric signal indicative or otherwise representative of the sensed temperature. The one or more temperature sensors 440(1)-440(N) may include, for example and not limited to, one or more thermometers, one or more thermistors, one or more thermocouples, one or more resistance thermometers and one or more silicon bandgap temperature sensors.

Processor 410 may be operatively coupled to the one or more temperature sensors 440(1)-440(N), GPU 420, display device 430 and memory device 450. Processor 410 may include various electronic circuits each configured to perform a respective set of functions. For instance, processor 410 may include a reception unit 412, a determination unit 414 and a control unit 416. Reception unit 412 may be configured to receive information and data from the one or more temperature sensors 440(1)-440(N), GPU 420, display device 430 and memory device 450. Determination unit 414 may be configured to determine whether a temperature of at least one portion of apparatus 400 exceeds a temperature threshold based on the received information. Determination unit 414 may be further configured to determine whether a variation in a frame rate of images displayed on display device 430 or another display device associated with apparatus 400 (e.g., a television in wireless communication with apparatus 400 to receive data for display) exceeds a variation threshold. Control unit 416 may be configured to control the frame rate in response to either or both of the following conditions: (1) a first determination that the monitored temperature exceeds the temperature threshold, and/or (2) a second determination that the variation in the frame rate exceeds the variation threshold.

In some implementations, in controlling the frame rate, control unit 416 of processor 410 may be configured to limit a frequency at which the frame rate is varied or lower the frame rate to one of one or more predefined frame rates. In some implementations, in limiting the frequency at which the frame rate is varied, control unit 416 of processor 410 may be configured to modify a frequency of a periodic signal originated from a display controller (which may be implemented in GPU 420 but not limited thereto). In some implementations, in modifying the frequency of the periodic signal, control unit 416 of processor 410 may be configured to selectively drop or bypass the periodic signal. Alternatively or additionally, in modifying the frequency of the periodic signal, control unit 416 of processor 410 may be configured to perform a number of operations. For instance, control unit 416 may generate a replacement signal periodically at a frequency different from the frequency of the periodic signal. Moreover, control unit 416 may replace the periodic signal with the replacement signal. Alternatively or additionally, in modifying the frequency of the periodic signal, control unit 416 of processor 410 may be configured to selectively modify the frequency of the periodic signal at an output of a display driver, a hardware composer or a display server. The display driver, the hardware composer and the display server may be implemented in GPU 420 and/or display device 430 (or the remote display device).

In some implementations, in controlling the frame rate, control unit 416 of processor 410 may be configured to set the frame rate based on the temperature of the at least one portion of apparatus 400 and a previous frame rate before the controlling.

In some implementations, apparatus 400 may include one or more IC chips contained within casing 470, including and not limited to processor 410 and GPU 420. In determining whether the temperature of at least one portion of apparatus 400 exceeds the temperature threshold, control unit 416 of processor 410 may be configured to perform a number of operations. For instance, control unit 416 may monitor a first temperature of at least one of the one or more IC chips. Additionally, control unit 416 may monitor a second temperature of casing 470. Furthermore, control unit 416 may determine whether the first temperature exceeds a first temperature threshold or the second temperature exceeds a second temperature threshold.

In some implementations, control unit 416 of processor 410 may be further configured to perform additional operations. For instance, control unit 416 may determine that the temperature of the at least one portion of apparatus 400 does not exceed the temperature threshold after the controlling. Consequently, control unit 416 may cease the controlling of the frame rate in response to the determining that the temperature of the at least one portion of apparatus 400 does not exceed the temperature threshold.

Figure 5:
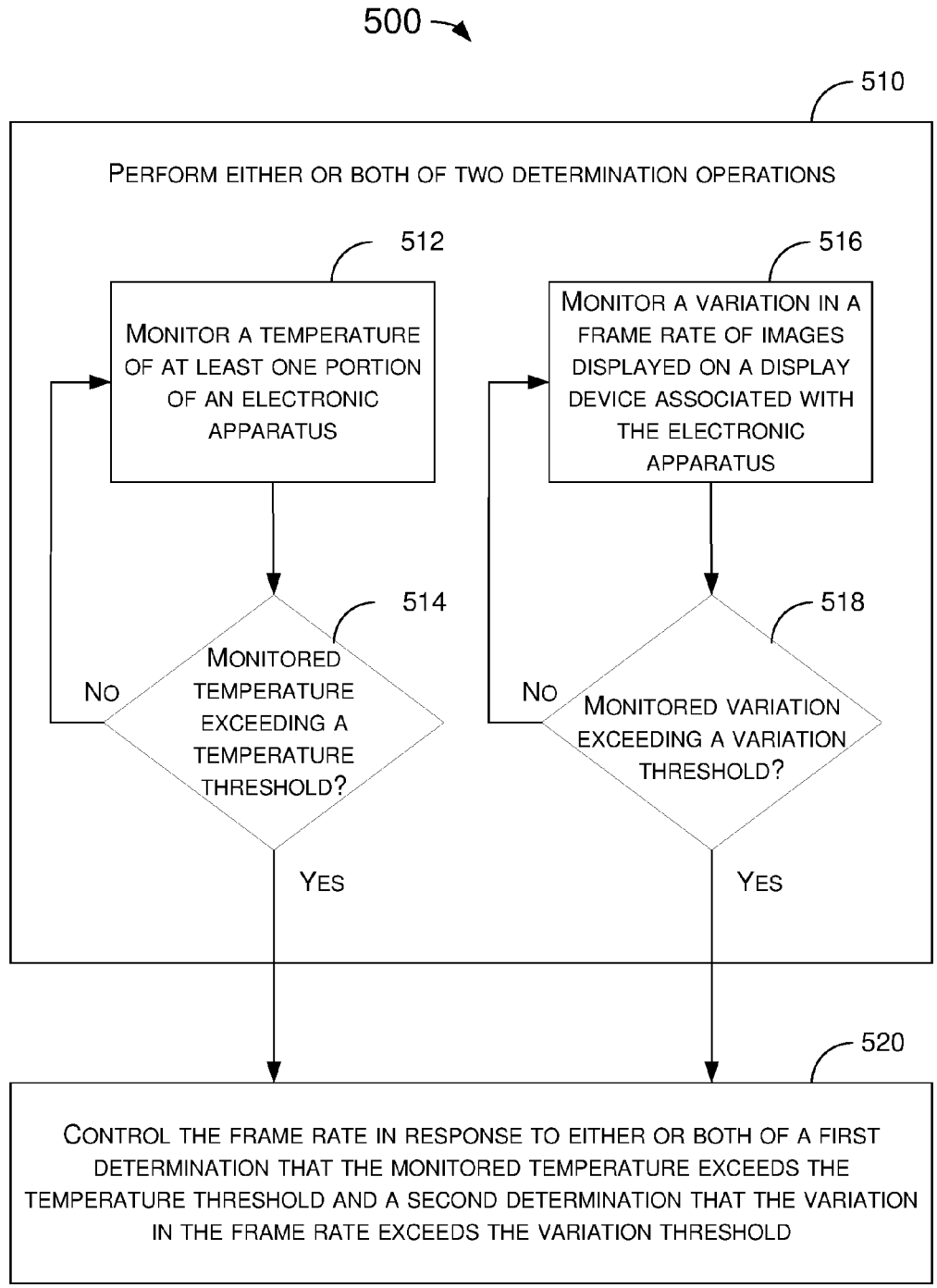
FIG. 5 is a flowchart of an example process in accordance with an implementation of the present disclosure.

FIG. 5 is a flowchart of an example process 500 in accordance with an implementation of the present disclosure. Process 500 may include one or more operations, actions, or functions as represented by one or more of blocks 510 and 520 as well as sub-blocks 512, 514, 516 and 518. Although illustrated as discrete blocks, various blocks of process 500 may be divided into additional blocks, combined into fewer blocks, or eliminated, depending on the desired implementation. The blocks and sub-blocks of process 500 may be performed in the order shown in FIG. 5 or in any other order, depending on the desired implementation. Process 500 may be implemented by apparatus 400 and any variations and/or derivatives thereof. Process 500 may be an example implementation of each of algorithm 200 and algorithm 300, whether partially or completely. Solely for illustrative purposes and without limiting the scope, operations of process 500 are described below in the context of apparatus 400. Process 500 may begin at block 510.

At 510, process 500 may involve processor 410 of apparatus 400 performing either or both of two checks or determination operations, involving sub-blocks 512, 514, 516 and 518.

At 512, process 500 may involve processor 410 monitoring a temperature of at least one portion of apparatus 400. Process 500 may proceed from 512 to 514.

At 514, process 500 may involve processor 410 determining whether the monitored temperature of the at least one portion of apparatus 400 exceeds a temperature threshold. In an event in which processor 410 determines that the temperature of the at least one portion of apparatus 400 does not exceed the temperature threshold, process 500 may proceed from 514 to 512 for continued monitoring. Otherwise, in an event in which processor 410 determines that the temperature of the at least one portion of apparatus 400 exceeds the temperature threshold, process 500 may proceed from 514 to 520.

At 516, process 500 may involve processor 410 monitoring a variation in a frame rate of images displayed on a display device associated with apparatus 400 (e.g., display device 430 or a remote display device wirelessly receiving data from apparatus 400 for display). Process 500 may proceed from 516 to 518.

At 518, process 500 may involve processor 410 determining whether the monitored variation in the frame rate of images displayed on display device 430 exceeds a variation threshold. In an event in which processor 410 determines that the variation in the frame rate of images displayed on display device 430 does not exceed the variation threshold, process 500 may proceed from 518 to 516 for continued monitoring. Otherwise, in an event in which processor 410 determines that the variation in the frame rate of images displayed on display device 430 (or the remote display device) exceeds the variation threshold, process 500 may proceed from 518 to 520.

At 520, process 500 may involve processor 410 controlling the frame rate in response to either or both of a first determination that the monitored temperature exceeds the temperature threshold and a second determination that the variation in the frame rate exceeds the variation threshold. In other words, so long as one of the temperature threshold and variation threshold is exceeded, process 500 may involve processor 410 controlling the frame rate so as to achieve the intended results in accordance with the present disclosure.

In some implementations, in controlling the frame rate, process 500 may involve processor 410 limiting a frequency at which the frame rate is varied.

In some implementations, in controlling the frame rate, process 500 may involve processor 410 modifying a frequency of a periodic signal (e.g., a periodic timing control signal such as $V_{Sync}$) originated from a display controller (e.g., a display controller implemented in GPU 420). In some implementations, in modifying the frequency of the periodic signal, process 500 may involve processor 410 modifying the frequency of the periodic signal somewhere between the display controller and an application. In some implementations, in modifying the frequency of the periodic signal, process 500 may involve processor 410 selectively dropping or bypassing the periodic signal. Alternatively or additionally, in modifying the frequency of the periodic signal, process 500 may involve processor 410 performing a number of operations. For instance, process 500 may involve processor 410 generating a replacement signal periodically at a frequency different from the frequency of the periodic signal. Moreover, process 500 may involve processor 410 replacing the periodic signal with the replacement signal. Alternatively or additionally, in modifying the frequency of the periodic signal, process 500 may involve processor 410 modifying the frequency of the periodic signal by a display driver, a hardware composer or a display server. The display driver, the hardware composer and the display server may be functions operationally between display controller and display device 430 (or the remote display device).

In some implementations, in controlling the frame rate, process 500 may involve processor 410 lowering the frame rate to one of one or more predefined frame rates.

In some implementations, in controlling the frame rate, process 500 may involve processor 410 setting the frame rate based on the temperature of the at least one portion of apparatus 400 and a previous frame rate before the controlling.

In some implementations, in determining whether the temperature of at least one portion of apparatus 400 exceeds the temperature threshold, process 500 may involve processor 410 performing a number of operations. For instance, process 500 may involve processor 410 monitoring a first temperature of an IC chip of apparatus 400 (e.g., that of processor 410 itself, GPU 420 or another IC chip). Moreover, process 500 may involve processor 410 monitoring a second temperature of a casing of apparatus 400. Furthermore, process 500 may involve processor 410 determining whether the first temperature exceeds a first temperature threshold or the second temperature exceeds a second temperature threshold.

In some implementations, process 500 may further involve processor 410 performing operations in addition to blocks 510 and 520. For instance, process 500 may involve processor 410 determining that the temperature of the at least one portion of apparatus 400 does not exceed the temperature threshold after the controlling. Additionally, process 500 may involve processor 410 ceasing the control of the frame rate in response to the determination that the temperature of the at least one portion of apparatus 400 does not exceed the temperature threshold.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing both of:
determining whether a temperature of at least one portion of an electronic apparatus exceeds a temperature threshold; and
determining whether a variation in a frame rate of images displayed on a display device associated with the electronic apparatus exceeds a variation threshold; and
controlling the frame rate in response to both of a first determination that the monitored temperature exceeds the temperature threshold and a second determination that the variation in the frame rate exceeds the variation threshold.

2. The method of claim 1, wherein the controlling of the frame rate comprises limiting a frequency at which the frame rate is varied.

3. The method of claim 1, wherein the controlling of the frame rate comprises modifying a frequency of a periodic signal originated from a display controller.

4. The method of claim 3, wherein the modifying of the frequency of the periodic signal comprises selectively dropping or bypassing the periodic signal.

5. The method of claim 3, wherein the modifying of the frequency of the periodic signal comprises:
generating a replacement signal periodically at a frequency different from the frequency of the periodic signal; and
replacing the periodic signal with the replacement signal.

6. The method of claim 3, wherein the modifying of the frequency of the periodic signal comprises modifying the frequency of the periodic signal between the display controller and an application.

7. The method of claim 3, wherein the modifying of the frequency of the periodic signal comprises modifying the frequency of the periodic signal by a display driver, a hardware composer or a display server, and wherein the display driver, the hardware composer and the display server comprise functions operationally between the display controller and an application.

8. The method of claim 1, wherein the controlling of the frame rate comprises lowering the frame rate to one of one or more predefined frame rates.

9. The method of claim 1, wherein the controlling of the frame rate comprises setting the frame rate based on the temperature of the at least one portion of the electronic apparatus and a previous frame rate before the controlling.

10. The method of claim 1, wherein the determining of whether the temperature of at least one portion of the electronic apparatus exceeds the temperature threshold comprises:
monitoring a first temperature of an integrated-circuit (IC) chip of the electronic apparatus;
monitoring a second temperature of a casing of the electronic apparatus; and
determining whether the first temperature exceeds a first temperature threshold or the second temperature exceeds a second temperature threshold.

11. The method of claim 1, further comprising:
determining that the temperature of the at least one portion of the electronic apparatus does not exceed the temperature threshold after the controlling; and
ceasing the controlling of the frame rate in response to the determining that the temperature of the at least one portion of the electronic apparatus does not exceed the temperature threshold.

12. An apparatus, comprising:
a memory device configured to store data, one or more sets of instructions, or a combination thereof; and
a processor coupled to access the memory device to execute the one or more sets of instructions, the processor comprising:
a reception circuit configured to receive information;
a determination circuit configured to determine whether a temperature of at least one portion of the apparatus exceeds a temperature threshold based on the received information, the determination circuit further configured to determine whether a variation in a frame rate of images displayed on a display device associated with the apparatus exceeds a variation threshold; and
a control circuit configured to control the frame rate in response to both of a first determination that the monitored temperature exceeds the temperature threshold and a second determination that the variation in the frame rate exceeds the variation threshold.

13. The apparatus of claim 12, wherein, in controlling the frame rate, the processor is configured to limit a frequency at which the frame rate is varied or lower the frame rate to one of one or more predefined frame rates.

14. The apparatus of claim 13, wherein, in limiting the frequency at which the frame rate is varied, the processor is configured to modify a frequency of a periodic signal originated from a display controller.

15. The apparatus of claim 14, wherein, in modifying the frequency of the periodic signal, the processor is configured to selectively drop or bypass the periodic signal.

16. The apparatus of claim 14, wherein, in modifying the frequency of the periodic signal, the processor is configured to perform operations comprising:

generating a replacement signal periodically at a frequency different from the frequency of the periodic signal; and replacing the periodic signal with the replacement signal.

17. The apparatus of claim 14, wherein, in modifying the frequency of the periodic signal, the processor is configured to selectively modify the frequency of the periodic signal at an output of a display driver, a hardware composer or a display server, and wherein the display driver, the hardware composer and the display server comprise functions operationally between the display controller and an application.

18. The apparatus of claim 12, wherein, in controlling the frame rate, the processor is configured to set the frame rate based on the temperature of the at least one portion of the apparatus and a previous frame rate before the controlling.

19. The apparatus of claim 12, further comprising:
a casing; and
one or more integrated-circuit (IC) chips contained within the casing, wherein, in determining whether the temperature of at least one portion of the apparatus exceeds the temperature threshold, the processor is configured to perform operations comprising:
monitoring a first temperature of at least one of the one or more IC chips;
monitoring a second temperature of the casing; and
determining whether the first temperature exceeds a first temperature threshold or the second temperature exceeds a second temperature threshold.

20. The apparatus of claim 12, wherein the processor is further configured to perform operations comprising:
determining that the temperature of the at least one portion of the apparatus does not exceed the temperature threshold after the controlling; and
ceasing the controlling of the frame rate in response to the determining that the temperature of the at least one portion of the apparatus does not exceed the temperature threshold.

* * * * *